United States Patent [19]

Harris

[11] 4,043,778
[45] Aug. 23, 1977

[54] ELECTRIC RESISTANCE BUSHING FOR MELTING INORGANIC MATERIALS
[75] Inventor: Walter William Harris, Toledo, Ohio
[73] Assignee: Johns-Manville Corporation, Denver, Colo.
[21] Appl. No.: 729,914
[22] Filed: Oct. 5, 1976

Related U.S. Application Data
[63] Continuation of Ser. No. 587,505, June 16, 1975, abandoned.
[51] Int. Cl.² .......................................... C03B 37/02
[52] U.S. Cl. .................................. 65/1; 13/6; 65/12
[58] Field of Search .............. 65/1, 2, 12, DIG. 4; 13/6

[56] References Cited
U.S. PATENT DOCUMENTS

| 3,065,613 | 11/1972 | Von Wranaw | 65/1 |
| 3,068,669 | 12/1962 | Fiedler | 65/1 |
| 3,573,014 | 3/1971 | Strickland et al. | 65/1 |
| 3,607,164 | 9/1971 | Thom et al. | 65/1 |

OTHER PUBLICATIONS
The Manufacturing Technology of Continuous Glass Fibres, 1973, K L Loewenstein, Elsevier Scientific Pub. Co. pp. 97-110.

Primary Examiner—Robert L. Lindsay, Jr.
Attorney, Agent, or Firm—Robert M. Krone; Joseph J. Kelly

[57] ABSTRACT

The present invention involves an electrical resistance heated bushing for melting inorganic materials, particularly glass, and for exuding molten material through a plurality of orifices in the bushing to form fibers suitable for coating with metal in conventional ways. The bushing of the present invention has an output capacity of almost 300% that of typical prior art bushings used for this purpose. Furthermore, the bushing of the present invention has increased operating efficiency substantially. The average running time before a breakout occurs has been extended 5 to 10 fold.

15 Claims, 5 Drawing Figures

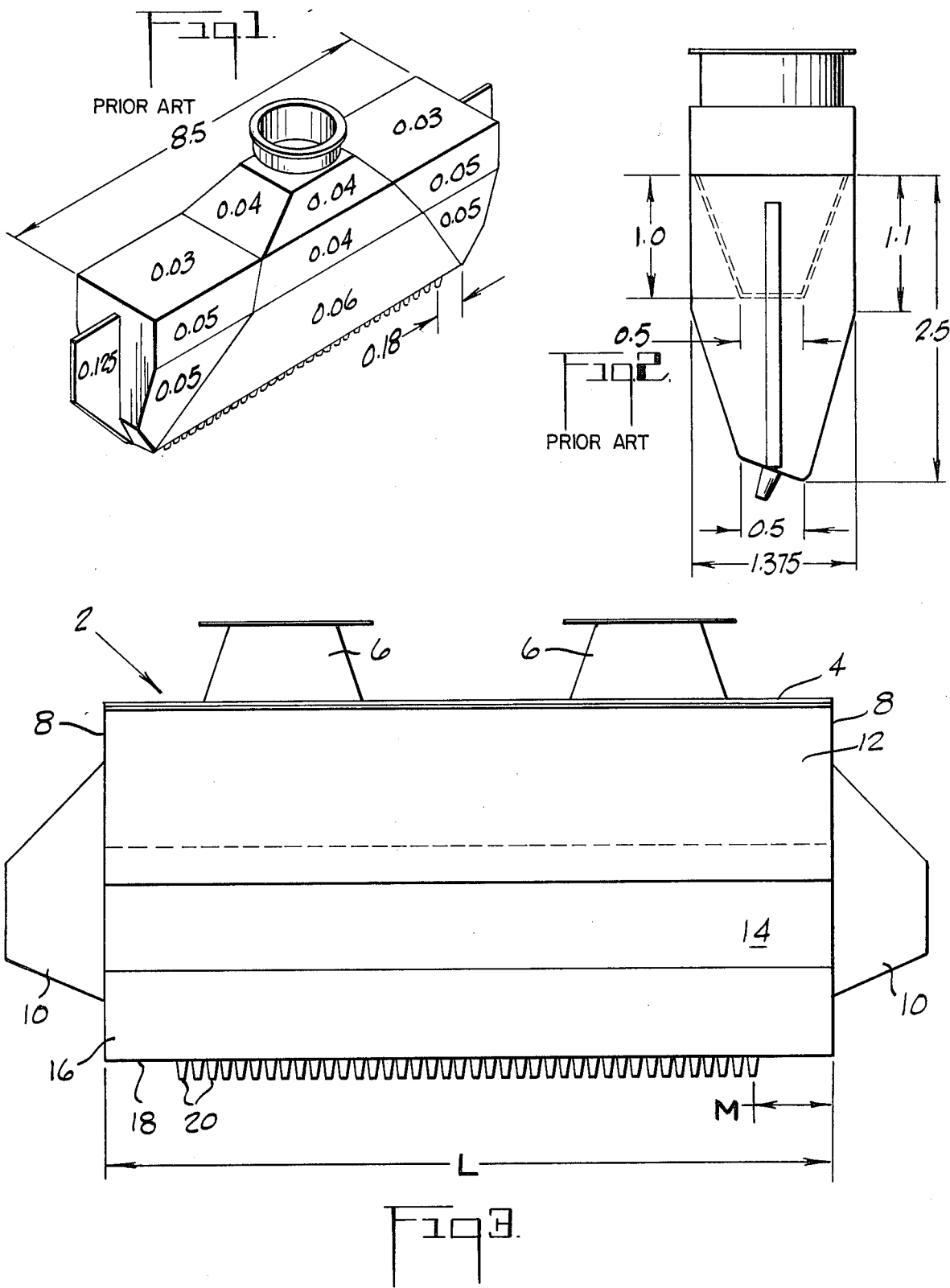

- ○ PRIOR ART BUSHING
- × PRESENT INVENTION ated by reference.
ELECTRIC RESISTANCE BUSHING FOR MELTING INORGANIC MATERIALS This is a Continuation of application Ser. No. 587,505, filed June 16, 1975 now abandoned.

The present invention involves an electrical resistance heated bushing for melting inorganic material and for exuding said material through orifices in the bottom thereof, and particularly for melting and exuding glass fibers suitable for coating with a metal using conventional metal coating processes and apparatus.

Metal coated glass fibers can be made by exuding molten glass through orifices in a bushing, drawing fibers from each of the orifices, and pulling the fibers over a molten metal applicator such as those shown in U.S. Pat. Nos. 2,861,393 and 2,928,716. When the molten glass is formed by remelting solidified glass forms, such as marbles, an electrical resistance bushing is used such as that shown in FIGS. 1 and 2. Using such a bushing, the output has been very limited by the ability of the bushing to produce uniform temperature glass along the length of the row of orifices and due to frequent breakouts. A breakout occurs when one or more of the fibers break.

Due to non-uniform temperature along the length of the prior art bushings, the fibers produced had varied diameters. This situation severely limited the melt rate of the bushing, since the hotter tips prevented increasing the temperature as necessary to increase the melt rate, and also caused frequent breakouts. The way the fibers are handled in the metal coating step is relatively abusive to the fibers and if the fiber diameter varies much from nominal, the smaller diameter fibers will be frequently broken by the abuse. When a breakout occurs, production must be discontinued until all of the orifices are producing continuous fibers. Using a prior art bushing like that shown in FIGS. 1 and 2, the average running time before a breakout occured was unsatisfactory.

SUMMARY OF THE INVENTION

An improved bushing has been developed in which certain dimensions are critical with respect to other dimensions. Such a bushing will produce fiber at a rate of almost 300% of the prior art bushings because it can be operated at a higher average temperature. Also, the improved temperature uniformity results in improved uniformity of fiber diameter. These improvements have extended the average operating time before a breakout occurs 5 to 10 fold.

BRIEF DESCRIPTION OF THE DRAWINGS

FIG. 1 is a perspective view of a typical prior art bushing used to make glass fibers suitable for coating with a metal.

FIG. 2 is an end view of the bushings shown in FIG. 1.

FIG. 3 is a side elevational view of a preferred embodiment of the present invention.

DETAILED DESCRIPTION AND PREFERRED EMBODIMENTS

Referring to the prior art bushings shown in FIGS. 1 and 2, the thickness of the refractory metal, such as a 90% platinum/10% rhodium alloy, used to form the prior art bushing varies as shown on the drawings. The bushing is of welded construction. Typical dimensions for a 40 orifice (0.065 inch diameter) prior art bushing are also shown on FIGS. 1 and 2.

Figure 5:
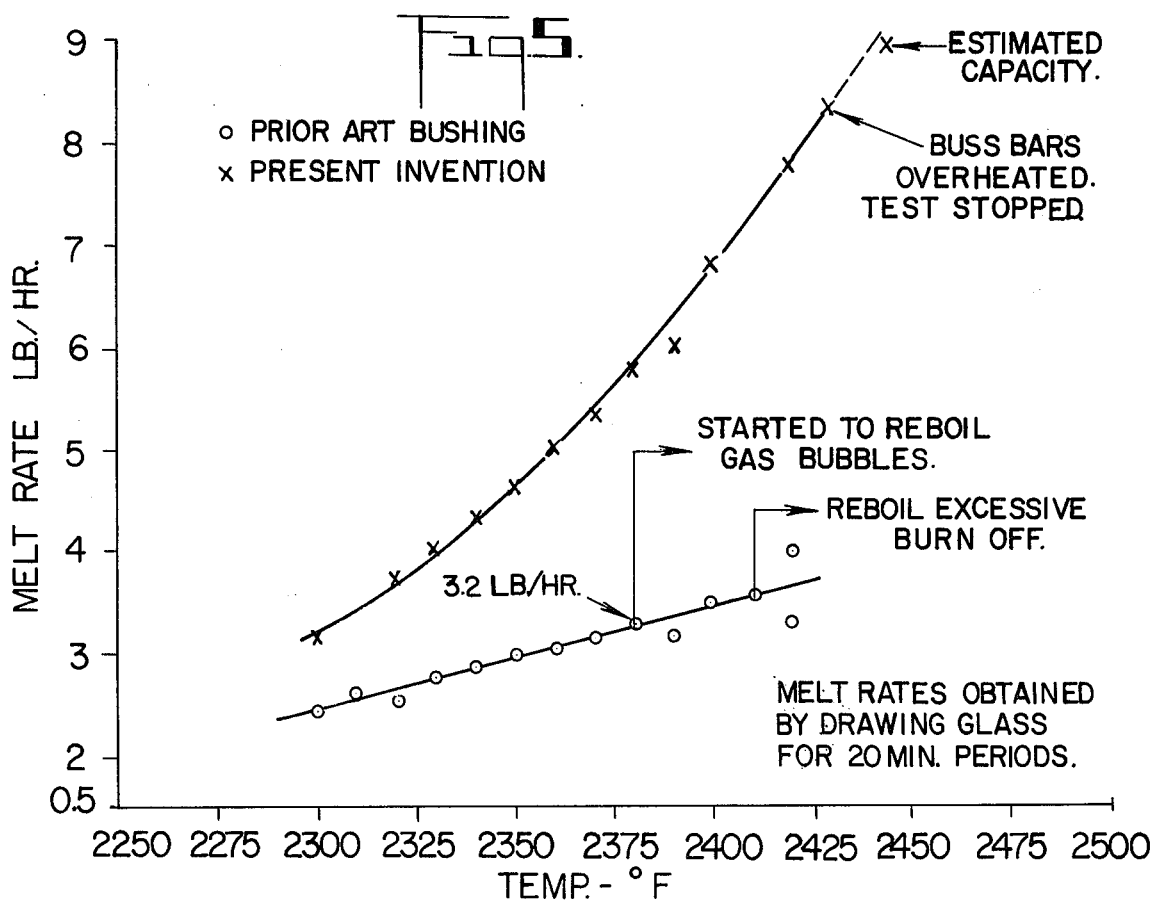
FIG. 5 is a graph showing the melt rate versus temperature, i.e., performance, of the bushings shown in FIGS. 1 and 3.

As shown in FIG. 5, the maximum output for the bushing shown in FIGS. 1 and 2 was about 3.2 lbs./hr. at about 2380° F (measured at about ⅜ inch from the longitudinal center line and ¼ inch above the tip plate). At this temperature reboil, formation of large gas bubbles, caused some of the orifices to close off and the glass meniscus of many orifices pulsated excessively indicating the glass in these orifices was too hot. Even at melt rates below 3.2 lbs./hr. the stability of the bushing was poor as evidenced by: (a) an excessive frequency of seeds, (b) pulsation of the meniscuses, (c) a hot band about ¾ inches wide that traversed the tip or orifice plate at 2-3 second intervals, (d) colder end tips than the tips in the center portion, (e) performance of the bushing was erratic, and (f) a very narrow, 58° F, operating range.

The present invention provides a bushing which eliminates or greatly reduces these problems with the prior art bushings, and provides a bushing having a higher output capacity and also a greater operating efficiency.

Figure 4:
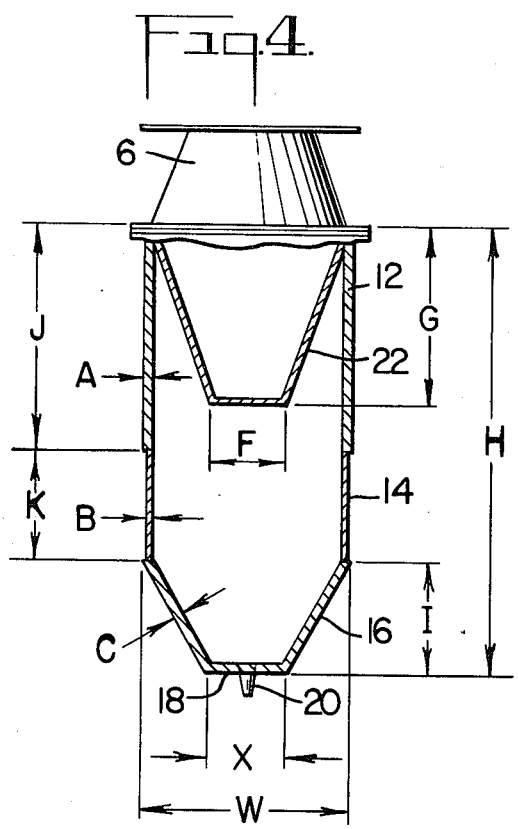
FIG. 4 is an end view, partially cut away to show a partial cross section, of the bushing shown in FIG. 3.

Referring to FIGS. 3 and 4, the present invention involves a bushing 2 comprised of a top plate 4, two inlets 6, two end plates 8, two terminal lugs 10, two upper sidewalls 12, two intermediate sidewalls 14, two lower, angled sidewalls 16, a tip plate 18, and orifice tips 20. The bushing also contains a perforated basket 22, preferably containing 0.055 inch diameter holes on 0.1 inch centers. The basket 22 may also have holes of different diameters as disclosed in U.S. Pat. No. 3,628,930, the disclosure of which is hereby incorporated by reference.

The bushing is preferably of welded construction with all parts being made of a refractory metal, e.g., an alloy of 90% platinum and 10% rhodium, 80% platinum and 20% rhodium and others. Preferably the refractory metal is a platinum alloy with the platinum constituting a major portion of the alloy.

In the preferred embodiment the top plate 2 has a thickness of 0.02 inches. This thickness can vary from a minimum thickness that will provide sufficient structural support to about 0.06 inches. The two inlets 6 in the preferred bushing are of truncated pyramidal shape but can be of other shapes, such as the cylindrical shape shown in FIG. 1, or a truncated conal shape. The two end plates 8 are preferably about 0.05 inches thick but can be thinner or thicker as desired. Generally, as the thickness is decreased, the ends will become hotter due to their higher resistance to electrical currents and vice versa. In the preferred embodiment the two terminal lugs 10 have a thickness of about 0.175 inches and the thickness of these can vary to affect the temperature of the ends of the bushing.

In the preferred embodiment the upper side walls 12 have a thickness A of about 0.04 inches and this thickness can vary from as little as the minimum needed to provide structural strength up to about 0.06 inches. In the preferred embodiment the intermediate sidewall portion 14 has a thickness B of about 0.02 inches and this thickness can also vary, but preferably should be about half to two thirds the thickness of the upper sidewalls 12 in accordance with the disclosure in U.S. Pat. No. 3,511,916, the disclosure of which is hereby incorporated by reference. In the preferred embodiment the lower sidewall portion 16 should have a thickness C of about 0.04 inches and this thickness can vary in the same manner as the upper sidewall 12. In the preferred embodiment the tip plate 18 has a thickness of about 0.05 inches and this thickness can also vary in the same manner as the upper sidewall.

The perforated basket 22 is about 0.03 inches thick in the preferred embodiment, but this thickness can be as little as about 0.02 inches and can be considerably thicker than the 0.03 inch preferred thickness.

The bushing of the present invention has overcome the problems of the prior art bushing, primarily by one or more of the following:

1. Increasing the width W of the bushing to at least 1.75 inches, and preferably to two inches or more up to about 3.25 inches.
2. Increasing the height H of the bushing to at least about 3.5 inches, and preferably to about 4.25 inches or more up to about 6 inches.
3. Increasing the length L of the bushing to increase the space M between the end of the bushing and the center of the first tip to at least 0.5 inch, and preferably to about 1 inch or more up to about 1.75 inches.
4. Providing for two or more marble inlets 6, preferably of truncated pyramidal shape, and increasing the volume of the internal basket 22 in proportion to the increased melting capacity of the bushing.
5. Increasing the volume of the trough section (that portion below the bottom of the intermediate side walls) and of the basket). The height of the tuning section (H minus G) should be at least 1.75 inches and preferably 2.5 inches or more up to about 4.25 inches.
6. Increasing the average width of the trough section thus reducing the primary cause of reboil.

In the preferred embodiment the heighth J of the upper sidewall 12 is about 2.25 inches, the heighth K of the intermediate sidewall 24 is about 1.125 inches and the vertical heighth I of the angled lower sidewall 16 is about 1.125 inches. The vertical height G of the basket 22 is about 1.75 inches and the width F of the bottom of the basket is about 0.75 inches. These heights can be increased by up to about 0.75 inch each. The width X of the tip plate 18 is also about 0.75 inch.

The dimensions of the bushing should be maintained at the minimum required for good results to keep the investment in the very expensive metal used to make the bushing to a minimum. Thus while dimensions larger than those mentioned above may be operable, they would not be desirable economically for a bushing having 40 sequential orifices.

The melt rate versus temperature, or performance, of the bushing shown in FIGS. 3 and 4, while run under exactly the same conditions as the prior art bushings, is compared with the performance curve of the prior art bushing in FIG. 5. In this performance test, the melt rates were obtained by drawing glass from the orifices for 20 minute periods. The temperature was taken at about ⅜ inch off of the longitudinal center line of the bushing and about ¼ inch above the orifice plates. No attempt was made to metal coat the glass fibers during this period in order to obtain true melt rate performance for the bushings. As shown by the curves in FIG. 5 the bushing of the present invention achieved a melt rate capacity of about 8.3 lbs/hr. before the buss bars bringing the electrical energy into the bushing overheated, requiring that the test be stopped. The buss bars overheated due to their improper location with respect to the bushing, and therefore do not actually indicate the true bushing capacity. This problem could be overcome by merely relocating the buss bars, and when this is done it is estimated that the capacity of the bushing will be at least about 9 lbs./hr.

In either case, the melt rate capacity of the bushing of the present invention is at least almost 300% greater than that of the prior art bushing. Furthermore, the stability of the bushing in the present invention is improved substantially as indicated by a significant reduction in the variation of filament diameter among the 40 orifices in the preferred embodiment, which has significantly increased the efficiency of the bushing. When the bushing of the present invention is used to produce fibers for metal coating, the average operating time for the bushing before a breakout occurs is extended to 5 to 10 fold that of the prior art bushings.

Finally, the bushing of the present invention requires less time (man hours), to fabricate than prior art bushings due to the reduced number of faces, fewer angles, and its overall greater simplicity. While the embodiments discussed in the present invention all have 40 orifices, there is nothing critical about the number of orifices. The bushing can be lengthened or shortened to provide for more or less orifices. Also, while the preferred embodiment contains a single row of orifices, all of which are in-line, it is not necessary that the orifices all have a common center-line. For example, they can be staggered, either randomly or in a repeating pattern, and their diameters can overlap lengthwise of the bushing.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead it is to be limited only by the claims appended hereto.

I claim:

1. In a refractory metal bushing for melting inorganic materials by passing electrical current through said metal, said bushing having a top wall and a bottom wall, an inlet for the inorganic material and a plurality of orifices in said bottom wall for exuding molten inorganic material therethrough, said bushing being elongated with an end wall located on each end transverse to the elongation and terminal lug attached to each of said end walls, the improvement comprising:

a bushing having at least 40 orifices located sequentially along said elongation;

said bushing having
  a. a length sufficient to provide at each end thereof a space between each end of the bushing and the center of the closest tip of at least about 0.75 inch, and
  b. a width of at least 1.75 inches, and
  c. a height between the top wall and the bottom wall of the bushing of at least 3.5 inches.

2. The bushing as defined in claim 1 wherein said bushing contains at least two inlets for the inorganic material in the top wall.

3. The bushing as defined in claim 2 wherein said width is about 2 inches or more.

4. The bushing as defined in claim 3 wherein said height is about 4.25 inches or more and wherein the distance between a lower portion of a basket located in said bushing and the bottom wall is at least 1.75 inches.

5. The bushing as defined in claim 1 wherein said bushing has sidewalls comprising a top sidewall portion extending the length of the bushing, an intermediate sidewall portion extending the length of the bushing, and a lower sidewall portion extending the length of the bushing, said intermediate sidewall portion having a through the wall thickness that is significantly less than the thickness of the upper sidewall portion.

6. The bushing as defined in claim 4 wherein said bushing has sidewalls comprising a top sidewall portion extending the length of the bushing, an intermediate sidewall portion extending the length of the bushing, and a lower sidewall portion extending the length of the bushing, said intermediate sidewall portion having a through the wall thickness that is significantlyless than the thickness of the upper sidewall portion.

7. The bushing as defined in claim 1 wherein said refractory metal is a platinum alloy.

8. The bushing as defined in claim 6 wherein said bushing has sidewalls comprising a top sidewall portion extending the length of the bushing, an intermediate sidewall portion extending the length of the bushing, and a lower sidewall portion extending the length of the bushing, said intermediate sidewall portion having a through the wall thickness that is significantly less than the thickness of the upper sidewall portion.

9. The bushing as defined in claim 7 wherein said alloy is a Pt/Rh alloy with Pt constituting a major portion thereof.

10. The bushing as defined in claim 8 wherein said alloy is a Pt/Rh alloy with Pt constituting a major portion thereof.

11. A bushing as defined in claim 1 wherein the joints are welded joints.

12. A bushing as defined in claim 10 wherein the joints are welded joints.

13. A bushing as defined in claim 2 wherein said inlets are in the shape of truncated pyramids.

14. A bushing as defined in claim 12 wherein said inlets are in the shape of truncated pyramids.

15. The bushing as defined in claim 4 wherein said distance is 2.5 inches or more.

* * * * *